United States Patent [19]

Frei

[11] Patent Number: 4,892,186
[45] Date of Patent: Jan. 9, 1990

[54] CLOCK CONVEYOR PROVIDED WITH A PLURALITY OF ENTRAINMENT MEMBERS

[75] Inventor: Hans Frei, Oetwil am See, Switzerland

[73] Assignee: Ferag AG, Hinwil, Switzerland

[21] Appl. No.: 147,274

[22] Filed: Jan. 22, 1988

[30] Foreign Application Priority Data

Jan. 26, 1987 [CA] Canada .................................. 258/87

[51] Int. Cl.[4] ............................................ B65G 29/00
[52] U.S. Cl. .................... 198/803.01; 198/805
[58] Field of Search .............. 198/805, 465.1, 803.01, 198/465.4, 803.7, 461

[56] References Cited

U.S. PATENT DOCUMENTS

| | | | |
|---|---|---|---|
| 3,224,567 | 5/1963 | Kain | 198/805 |
| 3,620,357 | 11/1971 | Folkes | 198/805 |
| 4,201,286 | 5/1980 | Meier | 198/803.7 X |
| 4,431,102 | 2/1984 | Bittner | 198/803.01 X |
| 4,577,749 | 3/1986 | Pentith | 198/805 |
| 4,614,005 | 9/1986 | Townsend | 198/805 X |
| 4,641,583 | 2/1987 | Harrington | 198/803.01 X |
| 4,667,804 | 5/1987 | Dubuit et al. | 198/465.1 X |
| 4,742,906 | 5/1988 | Wallaart | 198/805 |

Primary Examiner—Robert J. Spar
Assistant Examiner—James R. Bidwell
Attorney, Agent, or Firm—Bell, Seltzer, Park and Gibson

[57] ABSTRACT

A plurality of entrainment members can be individually summoned or called for by a release or summoning mechanism and can be individually and successively coupled at a substantially uniform spacing with respect to one another by a shuttle or transfer wheel with an endless revolving driven traction element. In order to reduce the technical constructional expenditure and the noise emission during operation of the clock conveyor there are provided magnetic devices for coupling the entrainment members in force-locking or frictional manner with the endless revolving driven traction element.

20 Claims, 3 Drawing Sheets

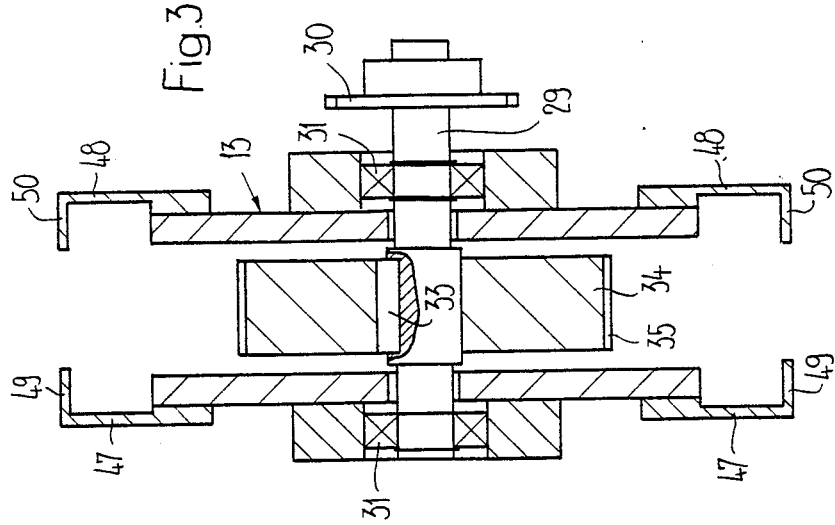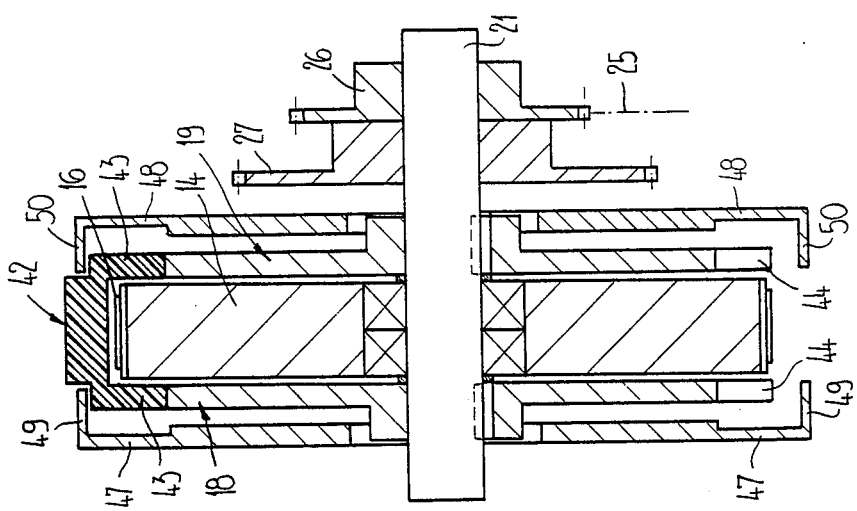

CLOCK CONVEYOR PROVIDED WITH A PLURALITY OF ENTRAINMENT MEMBERS

BACKGROUND OF THE INVENTION

The present invention relates to a new and improved construction of a clock or cycle conveyor.

In its more particular aspects the present invention relates to a clock or cycle conveyor comprising a plurality or multiplicity of entrainment members which can be individually summoned or called for by means of a release or summoning mechanism. The summoned entrainment members are coupled by means of at least one shuttle or transfer wheel individually and at a substantially uniform spacing from one another in succession at an endless revolving driven traction element.

Such type of clock or cycling conveyors serve, for instance, to render uniform or regular the mutual spacing of different types of articles, items or piece goods or the like, so that there can be accomplished at these articles, items or piece goods further working operations which are cyclically accomplished or carried out.

A clock conveyor of the previously mentioned type has been disclosed, for instance, in Swiss Pat. No. 618,398 and the U.S. Pat. No. 4,201,286, granted May 6, 1980, the disclosure of which is extensively comparable to the contents of the first mentioned Swiss Pat. No. 618,398.

With the heretofore known clock conveyors the entrainment members are equipped with controlled grippers or gripper elements and displaceably guided by means of rails parallel to themselves. Each of the entrainment members is additionally provided with a sprocket wheel which is freely rotatably mounted, however this sprocket wheel constitutes a brakeable sprocket wheel provided with a force-locking or frictional brake device. The sprocket wheel continuously engages with an endless revolvingly driven chain serving as a traction element. The brake device is constructed such that the braking action is eliminated when one of the entrainment members either abuts with the release mechanism or with a preceding or leading entrainment member which, in turn, has not yet been summoned or called for by the release mechanism, in other words such preceding entrainment member is still in a blocked state. Under these conditions the sprocket wheel can freely rotate, and thus the entrainment member is not entrained by the chain. As soon as the release mechanism has released the forwardmost or foremost entrainment member, then the sprocket wheel thereof is braked by the brake device and, since such brake device engages in a form-locking or frictional fashion with the chain, is entrained by the chain with a force which is dependent upon the braking force of the associated brake device. Moreover, the shuttle or transfer wheel which is provided dictates the spacing with respect to the preceding or leading entrainment member.

This heretofore known clock or cycle conveyor and, in particular, the entrainment members thereof, constitute quite complicated designed elements which, in order to remain functionally operational, necessitate intensive maintenance and servicing at regular intervals. This is particularly the case for the brake device provided at each of the entrainment members. Additionally, the prior art clock conveyor, when in operation, generates an appreciable amount of noise.

SUMMARY OF THE INVENTION

Therefore with the foregoing in mind it is a primary object of the present invention to provide a new and improved construction of a clock or cycle conveyor which is not afflicted with the aforementioned drawbacks and shortcomings of the prior art construction.

Another and more specific object of the present invention aims at the provision of a new and improved construction of a clock or cycle conveyor of the previously mentioned type which requires an appreciably lesser technological expenditure and only demands modest maintenance and servicing, wherein during operation of the clock or cycle conveyor there is a minimum of noise emission.

A further significant object of the present invention aims at the provision of a new and improved construction of a clock or cycle conveyor equipped with a multiplicity of entrainment members for conveying at a substantially uniform mutual spacing sundry articles or items or the like, wherein such clock or cycle conveyor is of relatively simple construction and design, quite economical to manufacture, extremely reliable in operation, not readily subject to breakdown or malfunction, requires a minimum of maintenance and servicing, and emits a modicum amount of noise during operation.

Now in order to implement these and still further objects of the invention, which will become more readily apparent as the description proceeds, the clock or cycle conveyor of the present development is manifested by the features that magnetic means are provided in order to force-lockingly or frictionally couple the entrainment members with the traction element.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein:

FIG. 2 is a cross-sectional view, on an enlarged scale, of the arrangement of FIG. 1 taken substantially along the line II—II thereof;

FIG. 3 is a cross-sectional view, again on an enlarged scale, of the arrangement of FIG. 1 taken substantially along the line III—III;

DETAILED DESCRIPTION OF THE PREFERRED EMBODIMENTS

Describing now the drawings, it is to be understood that only enough of the construction of the clock or cycle conveyor of the present development has been depicted therein in order to simplify the illustration of the drawings and to enable those skilled in the art to readily understand the underlying principles and teachings of the present development.

Figure 1:
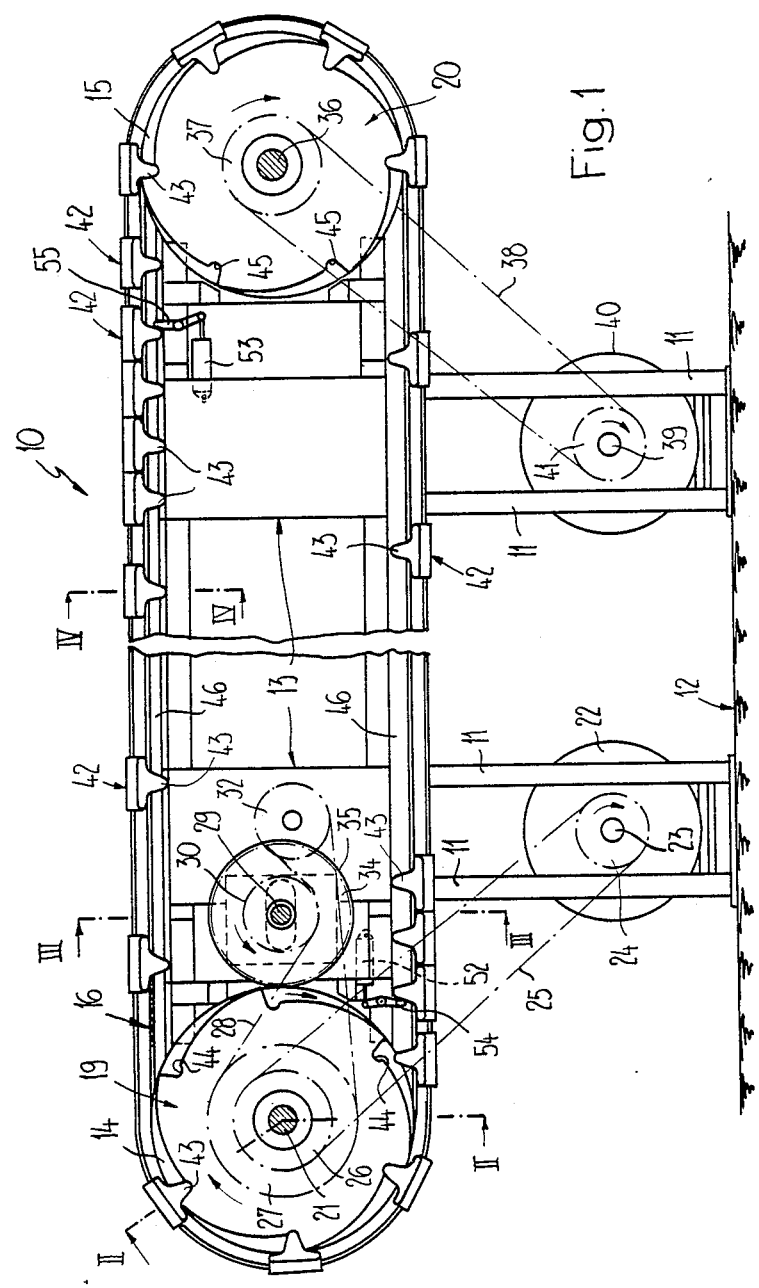
FIG. 1 is a fragmentary markedly shortened side view of a clock or cycle conveyor wherein an appreciable part of the central region thereof has been omitted from the showing to facilitate the illustration and while also omitting the guide and enclosure or encasing elements arranged at the side confronting the observer of the illustration of FIG. 1 in order to better reveal the depicted structure.

Turning attention now to FIG. 1 of the drawings, the clock or cycle conveyor 10 shown therein has been depicted in an appreciably shortened representation by conveniently omitting part of the central or intermediate portion of its construction to simplify the illustration. This clock conveyor 10 comprises a frame or frame structure 13 which is supported by means of supports, here in the form of columns or posts 11 upon the floor or ground 12 or other supporting surface or structure. As also will be recognized by referring to FIG. 2, in the frame or frame structure 13 there are rotatably mounted two deflection rolls or rollers 14 and 15 about which there is trained an internally toothed belt or toothed belt member 16. By referring to FIGS. 4 and 5 it will be recognized that there are embedded in the toothed belt or belt member 16 flexible metallic reinforcement inserts or insert members 17 which are preferably formed of any suitable soft magnetic or ferromagnetic material. These inserts or insert members 17, among other things, also serve to preclude undesired elongation of the toothed belt 16.

The externally toothed deflection roll or roller 14, which is rotatably mounted upon a shaft or shaft member 21, is appropriately driven as will be explained more fully hereinafter. This deflection roll 14 is bounded or flanked at opposite sides thereof by a pair of likewise driven shuttle or transfer wheels 18 or 19 which are keyed or otherwise appropriately connected for rotation with the shaft 21, as best recognized by referring to FIG. 2. The deflection roll or roller 15, which need not necessarily be externally toothed at its outer circumference, is, on the other hand, freely rotatably mounted, however likewise bounded or flanked by a pair of driven shuttle or transfer wheels 20 (in the illustration of FIG. 1 only one of these shuttle or transfer wheels 20 is visible).

A suitable drive motor 22 drives a sprocket wheel 26 or the like seated upon the shaft 21 by means of a sprocket wheel 24 seated upon the power-take off shaft 23 of the drive motor 22 and through the intermediary of a chain or chain member 25. A further sprocket wheel 27 is seated upon the shaft or shaft member 21. This sprocket wheel 27 has a further chain or chain member 28 trained thereabout, as shown in FIG. 1. The outer side of this chain 28 trains about a sprocket wheel 30 (FIG. 3) seated upon a further shaft or shaft member 29. This shaft 29 is mounted in roller bearings 31 or equivalent bearing means in the frame or frame structure 13. From the location of the sprocket wheel 30 the chain or chain member 21 leads about a freely rotatably mounted deflection wheel 32 (FIG. 1) and back to the sprocket wheel 27. A gear or gear member 34 is keyed by means of a key 33 or equivalent structure to the shaft 29. The teeth 35 of the gear 34 correspond to the teeth of the deflection wheel 14 and mesh therewith. The transmission ratio between the sprocket wheels 24 and 26, on the one hand, and the sprocket wheels 27, 30 as well as the gear 34 and the deflection wheel 14, on the other hand, is selected such that the circumferential velocity of the shuttle or transfer wheels 18 and 19 exceeds, and preferably by a small amount, the circumferential velocity of the deflection wheel or wheel member 14.

The shuttle wheels 20, depicted at the right-hand side of FIG. 1, seated rigidly for rotation upon the shaft or shaft member 36, are driven by means of a sprocket wheel 37 seated upon the shaft 36, a chain 38 and a sprocket wheel 41 seated upon the power take-off shaft 39 of a further drive motor 40. The two drive motors 22 and 40 need not always operate strictly in synchronism with one another, however in the embodiment under discussion it is advantageous if the number of revolutions or rotational speed thereof correspond to one another when viewed over a longer operating time.

Reverting again to FIG. 1, it will be recognized that the clock conveyor 10 is equipped with a multiplicity or plurality of entrainment members 42 which in the showing of FIG. 1 have only been schematically depicted. As to these entrainment members 42, they can be equipped with conveying implements or facilities accommodated to the articles or items or piece goods or the like which are to be conveyed, for instance these conveying implements or facilities may be in the form of hooks, clamps, grippers, which also may be constituted by controlled hooks, clamps or grippers and which conveying implements or facilities have not been particularly illustrated in FIGS. 1 to 5 since they may be of conventional design. Each of the entrainment members 42 is provided with projections here in the form of a pair of cams or dogs or lugs 43 by means of which each of the entrainment members 42 straddle the toothed belt or belt member 16. These cams or dogs 43 or the like are formed such that they fit into notches or cut-outs 44 and 45 provided at the outer side or circumference of the shuttle wheels 18, 19 as well as 20, respectively, and which notches 44 and 45 are arranged at a uniform circumferential spacing from one another at the outer surface or circumference of the related shuttle wheel 18, 19 and 20, respectively.

In order to retain the entrainment members 42 and toothed belt 16 at the immediate neighborhood of one another, the frame or frame structure 13 is provided with guide elements as will be now explained. On the one hand, these guide elements comprise a beam or beam member 46 which extends throughout the associated substantially linear or straight run of the toothed belt 16, the inner side or surface of which slides upon this beam or beam member 46. At the contact surfaces the toothed belt 16 and/or the beam 46 itself can be provided with a friction-reducing or anti-friction covering or lining, as generally respectively indicated by reference numeral 16a and 46a in FIG. 4. Also the toothed belt 16 at the side confronting the entrainment members 42 and/or the entrainment members 42 at the side confronting the toothed belt 16 may be provided with a suitable covering or lining, as generally indicated by reference numeral 100, which promote the mutual frictional contact of these elements.

On the other hand, belonging to such guide elements are also the holder or guide rails or rail members 47 and 48 which are arranged to both sides along the entire circulatory path or revolving path of motion of the toothed belt 16. These guide rails or rail members 47 and 48 each possess inwardly flexed or bent marginal or lateral flanges 49 and 50, respectively, which afford a lateral guiding of the entrainment members 42 and retain such at the direct neighborhood of the toothed belt 16.

Figure 4:
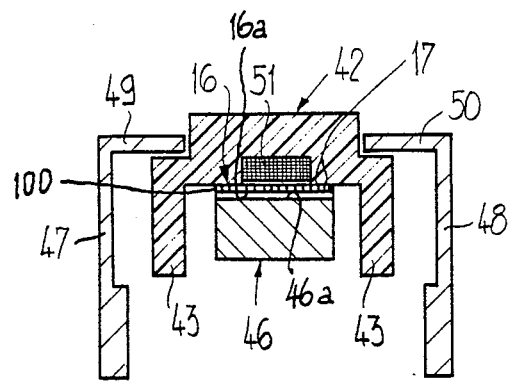
FIG. 4 is a sectional view of the arrangement of FIG. 1 taken substantially along the line IV—IV thereof.

In the embodiment depicted in FIG. 4 each of the entrainment members 42, each of which is essentially formed of a suitable plastic material, is provided with a permanent magnet 51. Each such permanent magnet 51 coacts with the reinforcements inserts or insert members 17 provided in the toothed belt or belt member 16. This coaction is augmented by virtue of the fact that in the arrangement of FIG. 4 the beam or beam member 46 is completely formed of a soft steel. To the extent that any given entrainment member 42 is not fixedly held or retained, then such entrainment member 42 is positively magnetically coupled with the toothed belt 16 and is entrained by such toothed belt 16.

From the showing of FIG. 1 it will be recognized that at the regions where the toothed belt 16 travels onto the deflection wheels 14 and 15, respectively, there is provided a respective holder lock or blocking device 54 and 55 of a respective release mechanism 52, 54 and 53, 55, and each such holder lock 54 and 55 is in the form of a double-arm lever. Each such holder lock or blocking device 54 and 55, coacting with the respective deflection wheels 14 and 15, can be selectively moved or thrusted into and moved or thrusted out of the circulatory path or revolving path of travel of the entrainment members 42 or, more specifically stated, the cams or dogs or lugs 43 thereof, due to the operation of a magnetic or pneumatic actuation element 52 and 53, respectively.

If the corresponding holder lock or blocking device 54 or 55, as the case may be, is moved or thrusted into the revolving path of travel of the entrainment members 42 and the cams or dogs 43 or the like thereof, then the entrainment members 42 are prevented from being entrained by the further travelling toothed belt 16. This is readily possible since the force connection or action between the outer smooth side of the toothed belt 16 and the confronting side of the relevant entrainment member 42 is constituted by a purely frictional connection between two substantially flat or planar surfaces.

On the other hand, if the holder lock or blocking device 54 or, as the case may be, the other holder lock or blocking device 55, is rendered inoperative, in other words retracted or thrusted out of the path of travel of the entrainment members 42 for a short period of time, in other words in a pulse-like or impulse-like fashion, then the immediately abutting entrainment member 42 travels in conjunction with the toothed belt or belt member 16 onto the deflection wheel 14 or, as the case may be, the deflection wheel 15, and at that location is so-to-speak "passed" or caught up with by the somewhat more rapidly revolving shuttle or transfer wheel 18, 19 or, again as the case may be, the shuttle or transfer wheels 20, so that the cams or dogs 43 of the now released entrainment member 42 come to lie in one of the notches or cut outs 44 or, again as the case may be, the notches or cut outs 45. Hence, the spacing of the entrainment member 42 with respect to the preceding or leading entrainment member 42 is precisely defined and also remains in this defined state along the substantially linear or straight runs of the toothed belt 16 until the entrainment member 42 abuts against the rearmost entrainment member of the row of entrainment members 42 which bear at the holder lock or blocking device 55 or, as the case may be, the holder lock or blocking device 54. Under these conditions it will be apparent that the continuously revolving toothed belt or belt member 16 simply slides past the blocked or immobilized entrainment members 42.

Figure 5:
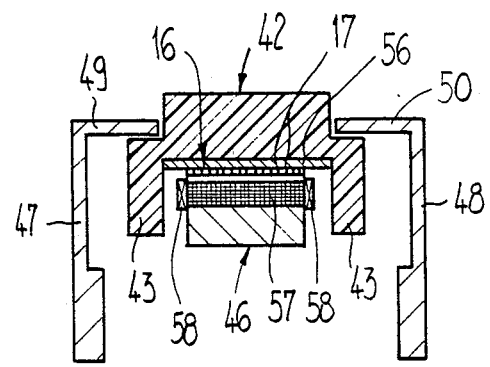
FIG. 5 illustrates a modified embodiment of the construction depicted in FIG. 4.

Continuing, the modified exemplary embodiment of FIG. 5 differs from that of FIG. 4 in that here the depicted entrainment member 42 is not provided with a permanent magnet, rather carries a soft magnetic plate or plate member 56. On the other hand, the beam or beam member 46 is provided at its side confronting the toothed belt or belt member 16 with a magnet or magnetic ledge or ledge member 57 which, in turn, for instance can be composed of a number of permanent magnets arranged in a row adjacent one another. However, the magnet or magnetic ledge member 57 can be also constituted by a ferromagnetic material which can be temporarily magnetized by externally exciting the same into a magnetic state as such has been generally indicated by the coils or windings 58.

Figure 6:
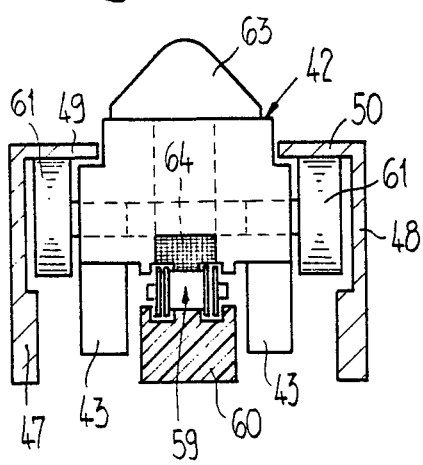
FIG. 6 is an illustration analogous to the showing of FIG. 4 of a still further modified embodiment of the arrangement of FIG. 4.
Figure 7:
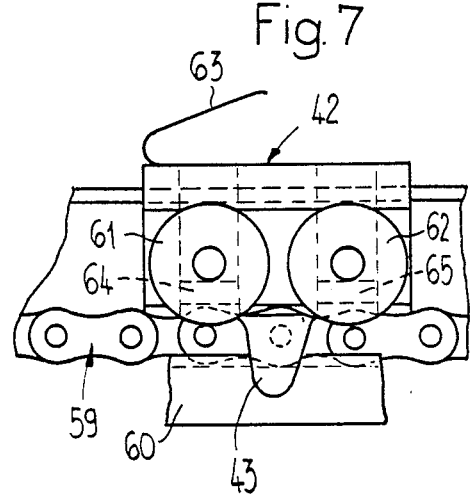
FIG. 7 schematically illustrates a side view of the embodiment of FIG. 6.

A still further embodiment of the invention is depicted in FIGS. 6 and 7. In this case the endless revolving driven traction element is not formed by a toothed belt or belt member, rather by means of a conventional roll or roller chain or chain member 59 which at the linear extending chain runs thereof is slidingly supported upon an associated rail or rail member 60 formed of, for instance, plastic material as generally depicted in FIGS. 6 and 7. It should be understood that with this exemplary embodiment the deflection rolls 14 and 15 would be replaced by appropriate chain sprocket wheels. The entrainment members 42 are here equipped with two pairs of rolls or rollers 61 and 62 which rollingly contact the inner surface of the marginal or lateral flanges 49 and 50 of the guide rails 47 and 48, as particularly shown for the pair of rolls or rollers 61 in the illustration of FIG. 6.

The entrainment members 42, which in this arrangement are each provided with an associated conveying or transport hook or hook member 63 or equivalent structure, are each provided with two permanent magnets 64 and 65. These two permanent magnets 64 and 65 of each entrainment member 42 directly coact with the roller chain 59 which is formed of steel serving as the magnetic material. What is particularly interesting with this exemplary embodiment is that at that location where an entrainment member 42 is present the roller chain 59 is so-to-speak raised from its associated rail or rail member 60, but in any event, however, must overcome a smaller friction at the rail or rail member 60. If a given one of the entrainment members 42 is hindered from travelling along with the roller chain or chain member 59 by the action of the holder lock or blocking device 54 or 55, as the case may be, and in the manner previously discussed, then the not particularly referenced rollers of the further travelling roller chain 59 simply roll upon the confronting surface of the relevant entrainment member 42 and specifically at the permanent magnets 64 and 65 thereof.

In the event that for the clock or cycle conveyor 10, depicted in the arrangement of FIG. 1, only the upper run which travels from the left towards the right of the illustration is employed as the conveying-active run, then it is unnecessary to provide the release or summoning mechanism 53, 55 and the shuttle or transfer wheels 20 as well as the drive thereof. In such case the entrainment members 42 then will first begin to pile up or collect when coming into contact with the holder lock or blocking device 54 of the release or summoning mechanism 52, 54.

Finally, it is mentioned that there have been conveniently omitted from the illustration of the drawings in order to simplify the portrayal thereof, the slide table or conveyor belts or bands confronting the one or the other run, or both, of the traction element and upon which there slide or are accompanyingly supported the articles or items or piece goods or the like which are engaged by the entrainment members 42 or by the conveyor suspension systems operatively associated with such entrainment members 42.

While there are shown and described present preferred embodiments of the invention, it is to be distinctly understood that the invention is not limited thereto, but may be otherwise variously embodied and practiced within the scope of the following claims. Accordingly,

What I claim is:

1. A clock conveyor comprising:
   a plurality of entrainment members;
   an endless revolvingly driven traction element at which there can be coupled said plurality of entrainment members wherein said endless revolvingly driven traction element comprises a belt member;
   a release mechanism for individually summoning the entrainment members for coupling thereof with said endless revolvingly driven traction element;
   at least one shuttle wheel for individually placing said entrainment members in succession and at a substantially uniform spacing from one another into a position such that said entrainment members can be coupled with the endless revolvingly driven traction element;
   means for coupling each of said entrainment members with said endless revolvingly driven traction element;
   said coupling means comprising magnetic means for force-lockingly coupling the entrainment members with the endless revolvingly driven traction element in order to thereby entrain and hold the entrainment members by said endless revolvingly driven traction element;
   each of said entrainment members being operatively associated with said belt member when coupled therewith;
   each of said entrainment members having a side confronting said belt member;
   said side confronting said belt member of each entrainment member comprising at least one permanent magnet;
   said belt member being provided with ferromagnetic elements; and
   said at least one permanent magnet of each entrainment member and said ferromagnetic elements of said belt member constituting said magnetic means for force-lockingly entraining and holding said entrainment members at said endless revolving driven traction element.

2. The clock conveyor as defined in claim 1, wherein:
   each one of said entrainment members contains two projections projecting from opposite transverse sides of the entrainment member;
   each of said entrainment members which is operatively associated with said belt member when in a position to be coupled therewith is structured such that it straddles said belt member; and
   said two projections extending beyond said belt member on both its longitudinal sides.

3. The clock conveyor as defined in claim 1, wherein:
   said ferromagnetic elements of said belt member comprises soft magnetic, flexible reinforcement inserts embedded in said belt member.

4. The clock conveyor as defined in claim 3, further including:
   a beam formed of a soft magnetic material;
   said belt member having a conveying-active run;
   said belt member further having a side facing away from the entrainment members;
   said belt member being slidingly guided at said side facing away from the entrainment members and at least along the conveying-active run over said beam; and
   at least said conveying-active run of said belt member extending intermediate said at least one permanent magnet of each one of the associated entrainment members and said beam.

5. The clock conveyor as defined in claim 1, further including:
   a beam formed of a soft magnetic material;
   said belt member having a conveying-active run;
   said belt member further having a side facing away from the entrainment members;
   said belt member being slidingly guided at said side facing away from the entrainment members and at least along the conveying-active run over said beam and
   at least said conveying-active run of said belt member extending intermediate said at least one permanent magnet of each one of the associated entrainment members and said beam.

6. The clock conveyor as defined in claim 1, wherein:
   said belt member comprises a toothed belt;
   pulley means for driving said toothed belt;
   said at least one shuttle wheel comprises a pair of spaced shuttle wheels; and
   said pulley means for driving said toothed belt being coaxially arranged between said pair of shuttle wheels.

7. The clock conveyor as defined in claim 1, wherein:
   said belt member has a side confronting the entrainment members; and
   said belt member being provided at the side confronting the entrainment members with covering means promoting frictional connection of the belt member with the entrainment members.

8. The clock conveyor as defined in claim 1, wherein:
   said side of said entrainment members confronting the belt member being provided with covering means promoting frictional connection of the entrainment members with the belt member.

9. The clock conveyor as defined in claim 1, wherein:
   said belt member is provided with a side confronting said entrainment members; and
   said side of said belt member confronting said entrainment members and said side of said entrainment members confronting said belt member each being provided with a respective covering means promoting mutual frictional connection of the entrainment members and the belt member with one another.

10. The clock conveyor as defined in claim 4, wherein:
    said beam is provided at a side thereof confronting the belt member with an anti-friction covering.

11. The clock conveyor as defined in claim 6, wherein:

each of said shuttle wheels of said pair of spaced shuttle wheels has an outer circumference provided with notches arranged at a substantially uniform spacing from one another;

each of said entrainment members being provided with projections engaging with said notches of said shuttle wheels; and means for driving said shuttle wheels at a slightly greater circumferential velocity than said pulley means for driving said toothed belt.

12. A clock conveyor comprising:

a plurality of entrainment members;

an endless revolvingly driven traction element at which there can be coupled said plurality of entrainment members wherein said endless revolvingly driven traction element comprises a belt member;

a release mechanism for individually summoning the entrainment members for coupling thereof with said endless revolvingly driven traction element;

at least one shuttle wheel for individually placing said entrainment members in succession and at a substantially uniform spacing from one another into a position such that said entrainment members can be coupled with the endless revolvingly driven traction element;

means for coupling each of said entrainment members with said endless revolvingly driven traction element;

said coupling means comprising magnetic means for force-lockingly coupling the entrainment members with the endless revolvingly driven traction element in order to thereby entrain and hold the entrainment members by said endless revolvingly driven traction element;

said entrainment members being operatively associated with said endless revolvingly driven belt member when in a position to be coupled therewith;

each of said entrainment members having a side confronting said belt member;

each of said entrainment members being provided at the side confronting said belt member with a soft magnetic plate member;

a magnet beam;

said belt member having a side facing away from said entrainment members;

said belt member slidingly guided at the side facing away from said entrainment members over said magnet beam; and said belt member extending intermediate said soft magnetic plate member of each one of said entrainment member and said magnetic beam.

13. The clock conveyor as defined in claim 12, wherein:

each one of said entrainment members contains two projections projecting from opposite transverse sides of the entrainment member;

each of said entrainment members operatively associated with said belt member is structured such that it straddles said belt member when in a position to be coupled with said belt member; and said two projections extending beyond said belt member on both of its longitudinal sides.

14. The clock conveyor as defined in claim 12, further including:

means for temporarily placing into a magnetic state the magnet beam.

15. The clock conveyor as defined in claim 12, wherein:

said magnet beam has a side confronting said belt member; and said side of said magnet beam confronting said belt member being provided with an anti-friction covering.

16. A clock conveyor comprising:

a plurality of entrainment members;

an endless revolvingly driven traction element at which there can be coupled said plurality of entrainment members wherein said endless revolvingly driven traction element comprises a roller chain;

a release mechanism for individually summoning the entrainment members for coupling thereof with said endless revolvingly driven traction element;

at least one shuttle wheel for individually placing said entrainment members in succession and at a substantially uniform spacing from one another into a position such that said entrainment members can be coupled with the endless revolvingly driven traction element;

means for coupling each of said entrainment members with said endless revolvingly driven traction element;

said coupling means comprising magnetic means for force-lockingly coupling the entrainment members with the endless revolvingly driven traction element in order to thereby entrain and hold the entrainment members by said endless revolvingly driven traction element;

a rail for guiding said roller chain;

said entrainment members being operatively associated with the roller chain when in a position to be coupled with said roller chain;

each of said entrainment members having a side confronting said roller chain;

each of said entrainment members being provided at said side confronting said roller chain with at least one permanent magnet of said magnetic means; and said at least one permanent magnet of each entrainment member and said roller chain constituting said magnetic means for force-lockingly coupling said entrainment members with said roller chain.

17. The clock conveyor as defined in claim 16, wherein:

said rail is formed of a plastic material.

18. The clock conveyor as defined in claim 16, wherein:

each one of said entrainment members contains two projections projecting from opposite transverse sides of the entrainment member;

each of said entrainment members when operatively associated with said roller chain being structured to straddle said roller chain; and said two projections extending beyond said roller chain on both its longitudinal sides.

19. The clock conveyor as defined in claim 16, further including:

guide rails arranged on both longitudinal sides of the roller chain; and each of said entrainment members being provided with rollers by means of which the entrainment members are rollingly guided at said guide rails.

20. The clock conveyor as defined in claim 16, wherein:

each said entrainment member, in an unreleased state under the action of said release mechanism, guides said roller chain for rolling movement; and each said entrainment member reducing friction between the roller chain and the rail in the region of said entrainment member as a result of the magnetic action by said at least one permanent magnet.

* * * * *

UNITED STATES PATENT AND TRADEMARK OFFICE
CERTIFICATE OF CORRECTION

PATENT NO. : 4,892,186
DATED     : January 9, 1990
INVENTOR(S) : Hans Frei

It is certified that error appears in the above-identified patent and that said Letters Patent is hereby corrected as shown below:

Column 5, line 11, after "soft" insert -- magnetic material or ferromagnetic material, for instance, of --

Signed and Sealed this

Eighth Day of January, 1991

Attest:

HARRY F. MANBECK, JR.

*Attesting Officer*       Commissioner of Patents and Trademarks

UNITED STATES PATENT AND TRADEMARK OFFICE
CERTIFICATE OF CORRECTION

PATENT NO. : 4,892,186

DATED : January 9, 1990

INVENTOR(S) : Hans Frei

It is certified that error appears in the above-identified patent and that said Letters Patent is hereby corrected as shown below:

```
On the face of the patent under Foreign Application
Priority Data, reference cited as "Jan. 26, 1987 [CA]
Canada................258/87" should be -- Jan. 26, 1987
[CH] Switzerland................258/87-5 --
```

Signed and Sealed this

Twenty-sixth Day of March, 1991

Attest:

HARRY F. MANBECK, JR.

*Attesting Officer*    *Commissioner of Patents and Trademarks*